(12) United States Patent
Osborne et al.

(10) Patent No.: US 7,460,013 B1
(45) Date of Patent: Dec. 2, 2008

(54) REMOTELY ACTUATED FLOOD FREE ZONE VALVE

(76) Inventors: Charles Agnew Osborne, 7255 Gresham Trace, Cumming, GA (US) 30040; Barbara W. Poole, 5588 Andrew Dr., Mableton, GA (US) 30126; Donavan E. Wade, 5092 Fawn Trail, Mableton, GA (US) 30126; Clarence E. Williams, 4721 Highway 2, Blue Ridge, GA (US) 30513

( * ) Notice: Subject to any disclaimer, the term of this patent is extended or adjusted under 35 U.S.C. 154(b) by 164 days.

(21) Appl. No.: 11/464,388

(22) Filed: Aug. 14, 2006

(51) Int. Cl.
*G08B 13/00* (2006.01)

(52) U.S. Cl. .................. 340/541; 340/606; 137/1; 137/39; 137/624.11; 251/129.04; 251/315.01

(58) Field of Classification Search .............. 340/605, 340/606, 603, 609, 541; 137/1, 39, 59, 79, 137/624.11, 460, 456, 487.5; 251/129.04, 251/315.01
See application file for complete search history.

(56) References Cited

U.S. PATENT DOCUMENTS

| 5,107,883 | A | 4/1992 | Shaw |
| 5,131,423 | A | 7/1992 | Shaw |
| 5,655,561 | A | 8/1997 | Wendel et al. |
| 5,848,609 | A * | 12/1998 | Marchesseault et al. ............ 137/624.11 |
| 5,971,011 | A | 10/1999 | Price |
| 6,237,618 | B1 * | 5/2001 | Kushner .................... 137/1 |
| 6,283,139 | B1 * | 9/2001 | Symonds et al. .......... 137/78.3 |
| 6,422,319 | B2 | 7/2002 | Haase, III |
| 6,491,062 | B1 | 12/2002 | Croft |
| 6,532,979 | B1 | 3/2003 | Richter |
| 6,691,724 | B2 | 2/2004 | Ford |
| 6,696,961 | B2 * | 2/2004 | Uhler ...................... 340/606 |
| 6,715,730 | B2 | 4/2004 | Ehr |
| 6,892,746 | B2 | 5/2005 | Ford |
| 7,147,204 | B2 * | 12/2006 | Hollingsworth et al. ............ 251/129.04 |
| 2005/0001186 | A1 | 1/2005 | Therriault |

* cited by examiner

*Primary Examiner*—Anh V La
(74) *Attorney, Agent, or Firm*—Womble Carlyle Sandridge & Rice, PLLC

(57) ABSTRACT

A remotely-actuated residential water supply cut-off system is disclosed. A remotely-actuated cut-off valve interposed in a residential water line downstream of a pressure-reducing valve. An electronic actuator is mounted on the cut-off valve and is remotely actuated to drive a DC motor in a clockwise or counterclockwise direction to open or close the cut-off valve in response to a received signal. The electronic actuator includes a transceiver, a microcontroller and a motor. The microcontroller drives the motor to open or close the valve in response to a wireless signal received by the transceiver. A handheld transceiver unit sends a signal to the actuator to open or close the cut-off valve, or operate in automatic mode.

18 Claims, 6 Drawing Sheets

REMOTELY ACTUATED FLOOD FREE ZONE VALVE

FIELD OF THE INVENTION

The invention relates generally to remotely actuated water cut-off valves and, more particularly to a remotely actuated flood free zone valve installed downstream of a pressure reducing valve inside a residential home.

BACKGROUND OF THE INVENTION

Polybutylene is a form of plastic resin that was used extensively in the manufacture of water supply piping in residential homes from 1978 to 1995. During this time, polybutylene was viewed as an inexpensive substitute for copper piping. The piping systems were used for both underground water mains and as interior water distribution piping. It is believed that oxidants in the public water supplies, such as chlorine, react with the polybutylene piping causing scaling, flaking and brittleness. Micro-fractures result and the basic structural integrity of the piping system is reduced. Polybutylene leaks have caused severe water damage in many homes resulting in numerous class action lawsuits. For realtors, property managers and home sellers, the potential liability for failure to disclose the existence of polybutylene piping is significant.

Heretofore, the only way to effectively counter the potential water damage from polybutylene piping has been to replace the polybutylene piping with copper piping. This is a very expensive solution for the average homeowner. More generally, there is a need for an inexpensive solution to the potential water damage caused by leaks in residential piping installations that can be installed in any residence to greatly reduce the risk of water damage by automatically shutting off the water supply inside the residence, whether the residence is a home, condominium or apartment, cottage or other vacation home.

SUMMARY OF THE INVENTION

Short of replacing existing polybutylene piping with copper piping, the present invention enables the homeowner to close the flood free zone valve of the system of the present invention to prevent any devastating leakage when the home is unoccupied or at other times (e.g., during overnight hours). The inventive valve can also be tied into the house security system so that water can still flow from the pressure reducing valve (PRV) to the inside fire sprinklers in case of fire. The valve can be activated (closed) by switch, security system or radio frequency signals. In an alternate embodiment, an RF-activated cut-off valve can be installed externally at the water meter and opened/closed from the street.

In one aspect of the invention, a remotely-actuated residential water supply cut-off system is provided. The water supply cut-off system includes a remotely-actuated cut-off valve that is interposed in a residential water line downstream of a pressure-reducing valve. An actuator is mounted on the cut-off valve and remotely actuated via radio frequency (RF) signals to drive a DC motor to open or close the cut-off valve in response to a received signal. A transceiver sends a signal to the actuator to open or close the cut-off valve.

In another aspect of the invention, an electronically controlled apparatus is provided for use in a remotely-actuated residential water supply cut-off system. The apparatus includes a ball valve interposed in a residential water line in a location that is downstream of a pressure-reducing valve, and an electronic actuator mounted on the valve. The electronic actuator includes a transceiver, a microcontroller and a motor. The microcontroller drives the motor to open or close the valve in response to a wireless signal received by the transceiver.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Figure 1:
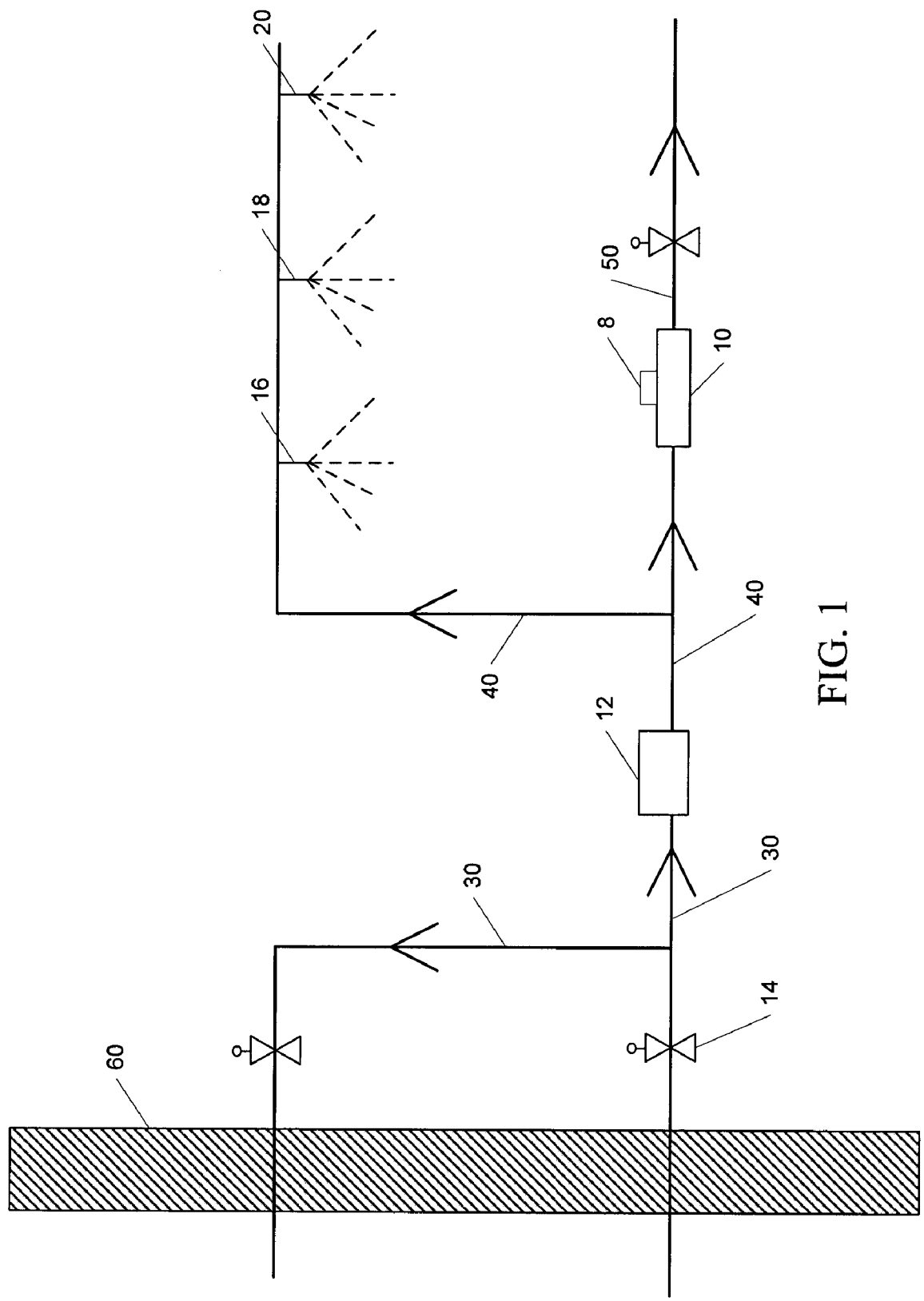
FIG. 1 illustrates a schematic showing the location of the remotely actuated flood free zone valve in accordance with an exemplary embodiment of the invention.

FIG. 1 illustrates a schematic showing the location of the remotely actuated flood free zone valve of the invention. The flood free zone valve 10 is positioned downstream of pressure reducing valve 12 and includes an actuator 8 used to open and close the valve remotely. In an exemplary embodiment the actuator 8 is controlled through radio frequency (RF) signals as further described below. The pressure reducing valve reduces the water pressure inside the residence to an appropriate flow 40 from the water supply pressure entering the residence through exterior wall 60. The main house cut-off valve 14 cuts off all water supply on line 30 to the residence, but is generally located at an inconvenient location to shut off and turn on the water supply to the home. Water supply 40, upstream of flood free zone valve 10, is provided to sprinklers 16, 18, 20 in the event of fire. Water supply 40 also flows through flood free zone valve 10 when the valve 10 is in the open position. Water supply 50 downstream of the flood free zone valve flows to house piping fixtures when the valve 10 is in the open position.

Figure 6:
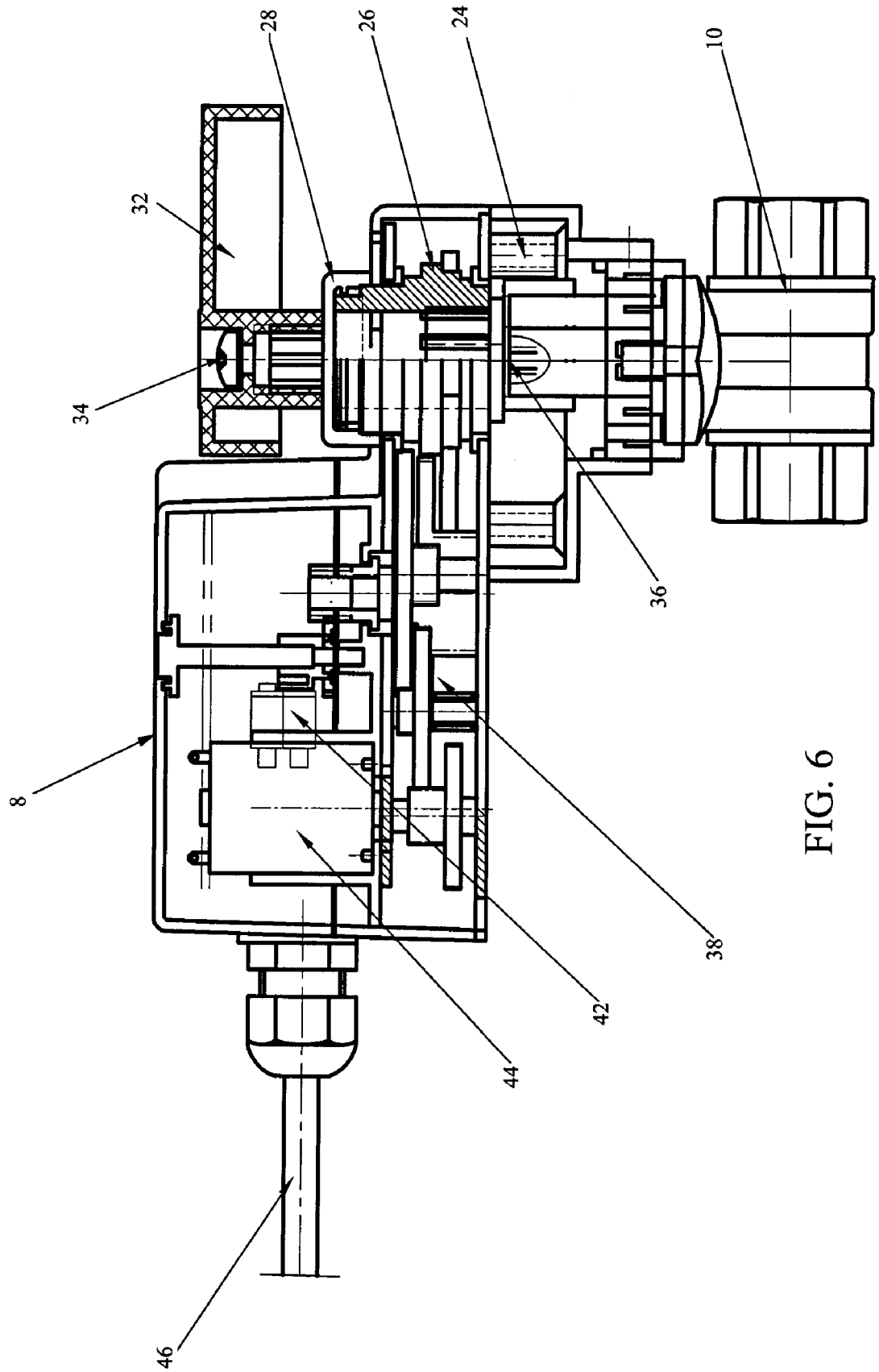
FIG. 6 illustrates the flood free zone valve and actuator in accordance with an exemplary embodiment of the invention.

FIG. 6 illustrates the flood free zone valve and actuator in an exemplary embodiment. The exemplary embodiment uses a ball valve 10 and actuator 8 mounted to the ball control valve as shown. Handle 32 is attached to the assembly by handle adapter 28. Also illustrated are shaft adapter 26, valve adapter 24, valve shaft adapter 36, blot 34. The actuator 8 includes motor 44, microswitches 42 and gears 38. Power cable 46 supplies 24 VDC power to the actuator 8. Microswitches 42 are limit switches that limit the current when the DC motor 44 is operating to open or close the valve 10.

The flood free zone valve actuator 8 is remotely controlled by a radio frequency transmitter in an exemplary embodiment. The main components of the valve actuator system are a handheld remote control unit (HHU), a home security system wireless adapter unit (HSU), an optional motion detector wireless control unit (MDU), and an electronic actuator control (ACT).

Figure 2:
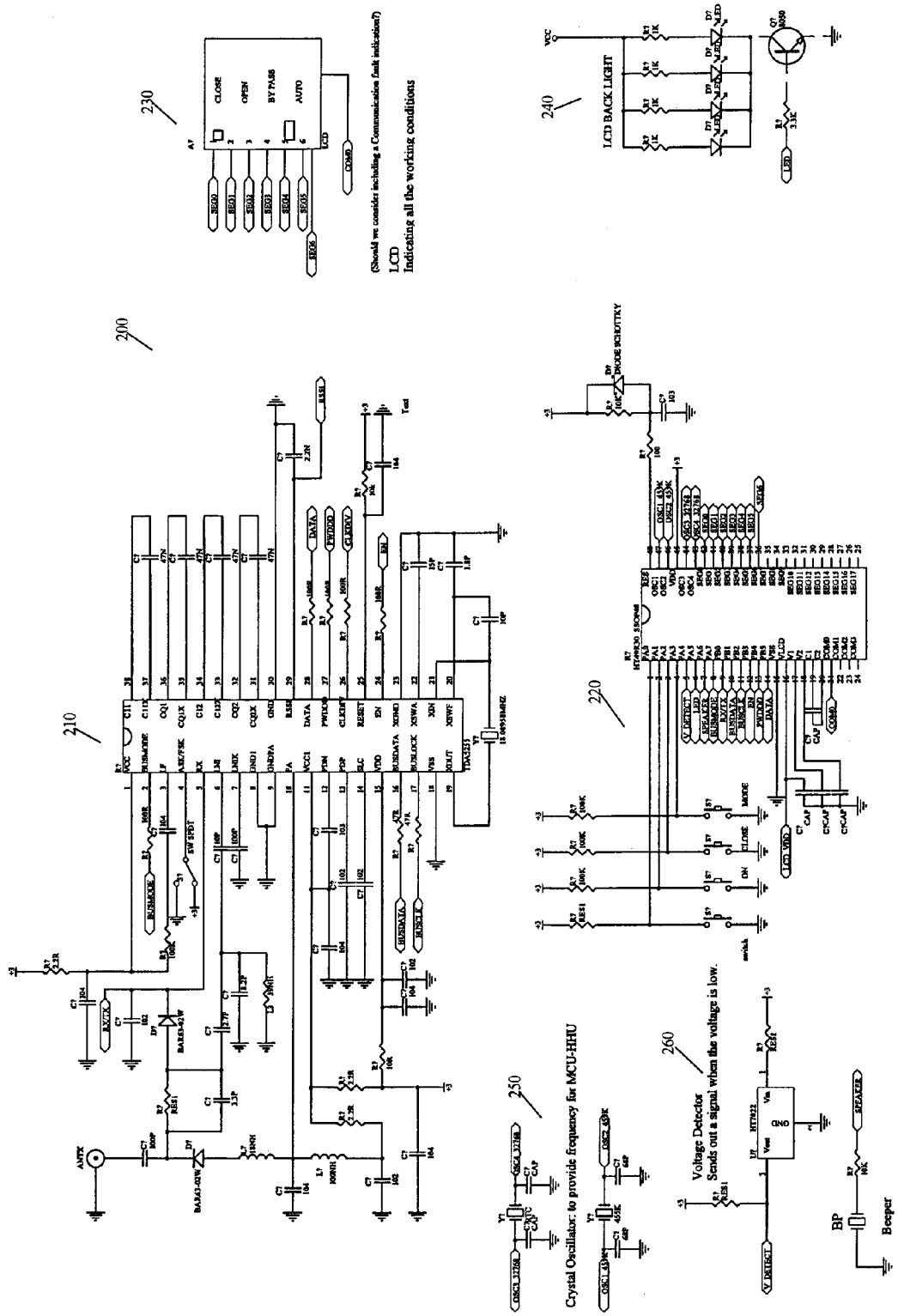
FIG. 2 illustrates an electronic schematic of the handheld remote control unit in accordance with an exemplary embodiment of the invention.

FIG. 2 illustrates an electronic schematic of the battery-operated handheld remote control unit in accordance with an exemplary embodiment. The battery life for the handheld unit is two years or less. The components of the handheld unit 200 in the exemplary embodiment include a 434 MHz amplitude-shift keying (ASK) or frequency-shift keying (FSK) wireless transceiver, a microcontroller unit 220, an LCD display 230, an LCD back light circuit 240, a crystal oscillator 250 and a voltage detector 260. The transceiver 210 is mounted inside the handheld unit 200 and receives signals from the microcontroller unit 220. The transceiver 210 does not have any external antenna to send or receive signals. The transceiver 210 sends signals to the actuator on the flood free zone valve, receives signals from the actuator and sends the received signals to the microcontroller unit 220. The operating range in an open area is less than 50 meters. There are three buttons on the handheld unit: open, close and auto. When the handheld unit is in the "snooze" position, pressing any one of the three buttons briefly will activate the handheld unit to a "working" position. At the same time, the handheld unit sends out the "read" instruction to the electronic actuator control. After the handheld unit receives the current status of the actuator's position, the status will be displayed in the LCD panel 230. When the handheld unit is in the "snooze" position, pressing any one of the three buttons for longer than three seconds will light up the LCD panel 230. Circuit 240 provides LCD back light illumination. The microcontroller 220 receives data from transceiver 210, outputs data to the transceiver for transmission to the actuator control, and outputs signals to the LCD display. Crystal oscillator 250 provides the operating frequency to the microcontroller 220. The voltage detector 260 sends out a signal when the voltage for the handheld unit is low.

When the handheld unit 200 is in the working position, pressing the "Open" button sends out the "Open" signal to the actuator. At that time the LCD 230 will display a continuously flashing "Open" readout until the handheld unit receives the "already open" signal back from the actuator. The LCD 230 then will display a solid (i.e., non flashing) "Open".

When the handheld unit is in the "working" position, pressing the "Close" button sends out the "Close" signal to the actuator. At that time the LCD 230 will display a continuously flashing "Close" readout until the handheld unit receives the "already closed" signal back from the actuator. The LCD 230 then will display a solid, non-flashing "Close." When the handheld unit is in the working position, pressing the "Auto" button sends out the "Automatic" signal to the actuator. At that time the LCD 230 will display a continuously flashing "Auto" readout until the handheld unit receives the "already automatic" signal back from the actuator. The LCD 230 then will display a solid, non-flashing "Auto."

When the actuator is in the "manual" position, the handheld unit LCD panel 230 will display "Bypass" and the open, close and auto buttons on the handheld unit will not work. Also, if the handheld unit is not operated for more than 30 seconds, it will automatically return to the "snooze" position.

The handheld unit LCD panel 230 meets the following specifications in an exemplary embodiment:
1. when sending signals, the LCD display flashes at a frequency of 10 Hz;
2. when the battery is low, the LCD display flashes at a frequency of 2 Hz;
3. when sending an "Open" signal, the LCD displays a flashing "Open" at a frequency of 2 Hz; when the actuator reaches the open position, the LCD display will change to a solid "Open;"
4. when sending the "Close" signal, the LCD displays a flashing "Close" at a frequency of 2 Hz; when the actuator is in the close position, the LCD display will be changed to a solid "Close;"
5. when sending a signal to the Actuator, if the actuator is in the "Manual" position, the LCD displays "Bypass;" and
6. when sending an "Automatic" signal, the LCD displays a flashing "Auto" at a frequency of 2 Hz; when the actuator is in the automatic position, the LCD display will be changed to a solid "Auto."

Figure 3:
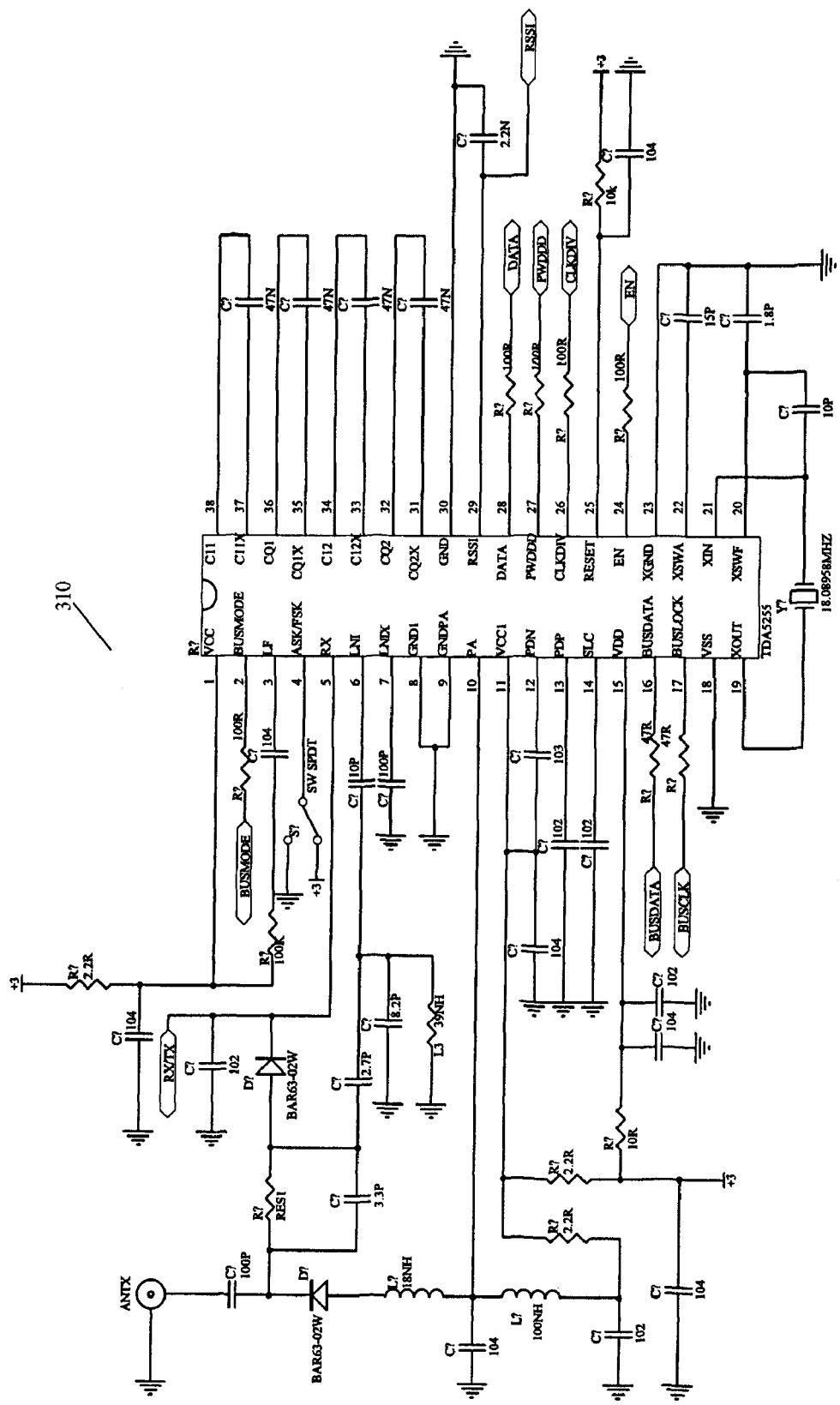
FIG. 3 illustrates an electronic schematic of a wireless transceiver for the flood free zone actuator in accordance with an exemplary embodiment of the invention.
Figure 4:
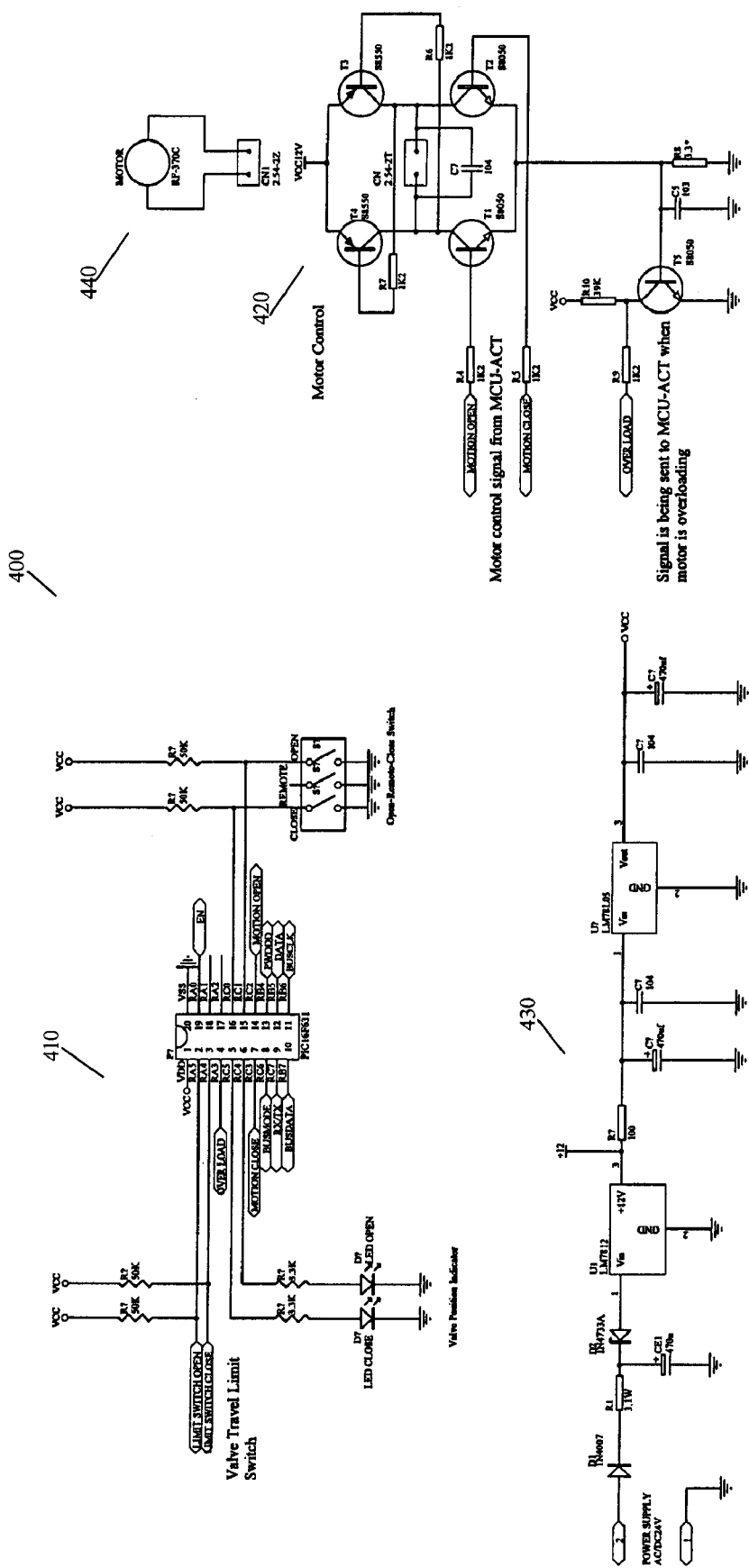
FIG. 4 illustrates electronic schematics of the microprocessor control unit, motor control and power supply for the flood free zone actuator in accordance with an exemplary embodiment of the invention.

FIG. 3 illustrates an electronic schematic of a wireless transceiver 310 for the flood free zone actuator in an exemplary embodiment. FIG. 4 illustrates the corresponding electronic schematics of the microprocessor control unit 410, motor control 420 and power supply 430 for the flood free zone actuator. The wireless transceiver 310 is mounted inside the actuator 400, receives signals from the handheld unit 200 and sends signals to the actuator microcontroller 410. The actuator 400 includes a three position switch. The positions are "Manual Open," "Remote," and "Manual Close." The switch has to be in the "Remote" position before the actuator 400 will be able to receive the wireless control signals from the handheld unit 200, the home security system wireless adapter 500 or the motion detector unit. When the switch is turned to the "Manual Open" or "Manual Close" position, and the actuator 400 receives the "read" signal from the handheld unit 200, the actuator 400 will send back a "Bypass" signal to the handheld unit.

The microcontroller 410 receives data from transceiver 310, receives an input from the three position switch and valve travel limit switch. It also can receive a motor overload signal. The microcontroller 410 outputs data to the transceiver 310, the motor running direction (i.e., valve open or valve close) and the valve open or close position indications.

The actuator controls the clockwise (open) or counter-clockwise (close) movement of a DC motor 440 though motor control 420. It measures the current of the motor 440 when it is in motion. It also has a "limit" function limiting the current when the motor is in motion. When the actuator 400 reaches its clockwise or counter-clockwise limit-switches, the actuator will send back the "already open" or "already closed" signals to the handheld unit 200, the home security system wireless adapter 500 or the motion detector unit. The actuator 400 executes the instructions received by the handheld unit 200, the home security system wireless adapter 500 or the motion detector unit based on the preset priorities. Motor control 420 also send a signal to microcontroller 410 when the motor is overloading.

The external power supply converts line 110/220 VAC power to 24 VDC power and supplies 24 VDC power to actuator 400 via a power cable. The actuator 400 filters and regulates the DC power and uses 12 VDC to run the motor 440 and 5 VDC to operate the controller 410 logic.

Figure 5:
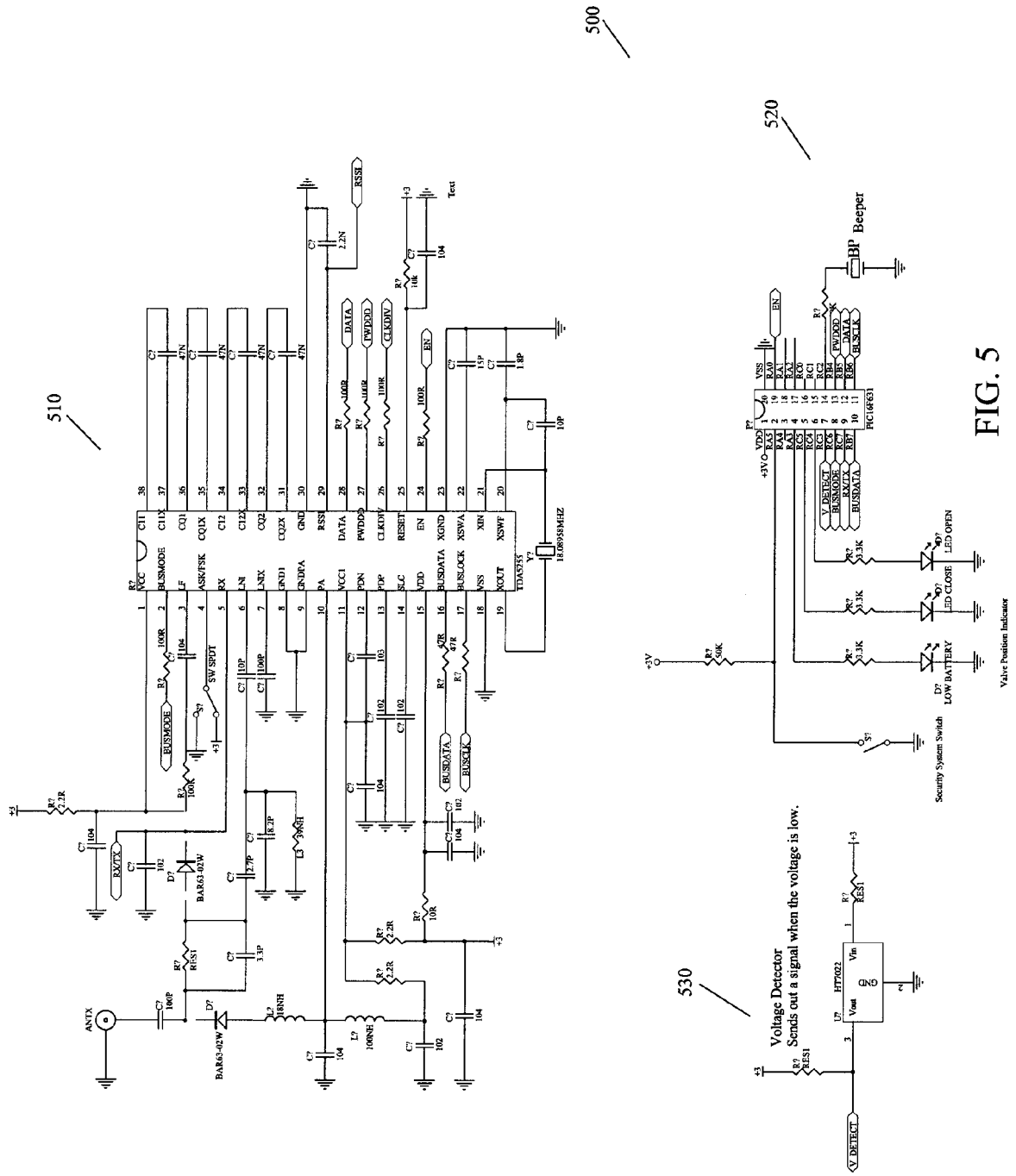
FIG. 5 illustrates electronic schematics for the home security system wireless adapter unit for the flood free zone actuator in accordance with an exemplary embodiment of the invention.

FIG. 5 illustrates electronic schematics for the home security system wireless adapter unit 500 for the flood free zone actuator. The wireless adapter unit 500 includes transceiver 510, microcontroller 520 and voltage detector 530. The transceiver 510 is mounted inside the home security system, receives control signals from the microcontroller unit 520, sends signals to, and receives signals from, the actuator, and sends signals from the actuator to the microcontroller 520. The microcontroller 520 receives data from, and outputs signals to, transceiver 510. The microcontroller 520 also receives a signal from voltage detector 530 when the voltage is low and outputs a low battery indication. The microcontroller 520 also outputs a valve open or close position indication.

The home security system wireless adapter 500 performs the following functions. The home security system wireless adapter will function only when the handheld unit is in the "Automatic" position. When the resident leaves the house and the home security system is being activated, the home security system will then activate the connecting home security system wireless adapter. The home security system wireless adapter 500 will read the actuator's position first; if the home security system wireless adapter is in the "close" position, the home security system wireless adapter will return to the "snooze" state. If the actuator is in the "Open" position, the home security system wireless adapter will send out the "Close" signal to the actuator and will go to the "snooze" position after it confirms that the actuator is closed.

When the home security system wireless adapter 500 is in use, the motion detector unit will not function. When the residents return home and de-activate the home security system, the home security system wireless adapter 500 will send an instruction to the actuator to return to its original position, i.e., the position before the resident left the house.

The optional motion detector unit (not illustrated) operates as follows. The motion detector unit will only function when the handheld unit is in the "Automatic" position and the home security system wireless adapter is not activated. The motion detector unit starts an internal clock when sensing that there is no movement in the house. When the motion detector unit senses no movement in the house for a specific period of time (e.g., an hour), it sends out the "Close" signal to the actuator and waits for the confirmation that the actuator is closed. When any motion is detected, the motion detector will immediately sends out "Open" signal to the actuator.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed:

1. A remotely-actuated residential water supply cut-off system for integration with a home security system comprising:
   a remotely-actuated cut-off valve interposed in a residential water line downstream of a pressure-reducing valve;
   an actuator including a transceiver and mounted on the cut-off valve and remotely actuated to open or close the cut-off valve in response to a wireless signal received by the actuator transceiver; and
   a wireless adapter unit, including a transceiver and microcontroller, integrated with the home security system and located remotely from the actuator for sending a signal to the actuator to close the cut-off valve when the home security system is armed, and a signal to return the cut-off valve to an initial position when the security system is disarmed.

2. The remotely-actuated residential water supply cut-off system of claim 1 further comprising a handheld unit including a radio frequency (RF) transceiver for transmitting an open or close signal to the actuator to control a position of the cut-off valve when the home security system is disarmed.

3. The remotely-actuated residential water supply cut-off system of claim 2 wherein the handheld unit further includes a microcontroller to generate the open or close signal, an LCD panel and an oscillator to provide a frequency of operation to the microcontroller.

4. The remotely-actuated residential water supply cut-off system of claim 3 wherein the LCD panel provides an indication of a current position of the cut-off valve.

5. The remotely-actuated residential water supply cut-off system of claim 1 wherein the actuator comprises, a microcontroller, a DC motor, a motor control and a power supply converter circuit.

6. The remotely-actuated residential water supply cut-off system of claim 5 wherein the actuator microcontroller sends a signal to the motor control to control a movement of the DC motor to open or close the cut-of valve.

7. The remotely-actuated residential water supply cut-off system of claim 1 wherein the cut-off valve is interposed downstream of both the pressure reducing valve and a water line connected to a residential sprinkler system.

8. The remotely-actuated residential water supply cut-off system of claim 5 wherein the actuator includes a switch that controls manual and remote operation of the cut-off valve.

9. An electronically controlled apparatus for use in a remotely-actuated residential water supply cut-off system, comprising:
   a valve interposed in a residential water line in a location that is downstream of a pressure-reducing valve;
   an electronic actuator mounted on the valve and including a transceiver, a microcontroller and a motor, wherein the microcontroller drives the motor to open or close the valve in response to a remotely transmitted wireless signal received by the transceiver; and
   a wireless adapter, including a transceiver and microcontroller, integrated with a home security system and located remotely from the electronic actuator for transmitting a signal to the actuator to remotely control the position of the valve both when the home security system is activated and deactivated.

10. The electronically controlled apparatus of claim 9 wherein the valve is inserted in the residential water line downstream of a water line connected to a residential sprinkler.

11. The electronically controlled apparatus of claim 9 wherein the remotely transmitted wireless signal received by the transceiver is a radio frequency (RF) signal transmitted by a handheld remote control device to open or close the valve.

12. The electronically controlled apparatus of claim 9 wherein the electronic actuator further comprises a motor control to control a movement of the motor to open or close the valve.

13. The electronically controlled apparatus of claim 9 wherein the electronic actuator further comprises a switch that controls a manual and remote operation of the valve.

14. The electronically controlled apparatus of claim 9 wherein the electronic actuator further comprises a power supply converter circuit.

15. The electronically controlled apparatus of claim 9 wherein the valve comprises a ball valve.

16. The electronically controlled apparatus of claim 9 wherein the electronic actuator further comprises a valve travel limit switch.

17. The electronically controlled apparatus of claim 12 wherein the motor control sends a signal to the microcontroller when the motor is overheating.

18. The electronically controlled apparatus of claim 9 wherein a residential flood free zone is provided by the valve when the valve is in a fully-closed position.

* * * * *